(12) United States Patent
Suwa et al.

(10) Patent No.: US 12,473,955 B2
(45) Date of Patent: Nov. 18, 2025

(54) COIL SPRING DEVICE

(71) Applicant: NHK SPRING Co., Ltd., Yokohama (JP)

(72) Inventors: Taisuke Suwa, Yokohama (JP); Yuichi Shibata, Yokohama (JP); Ippei Kokubun, Yokohama (JP); Tomoya Sugitani, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 413 days.

(21) Appl. No.: 17/952,932

(22) Filed: Sep. 26, 2022

(65) Prior Publication Data

US 2023/0026766 A1 Jan. 26, 2023

Related U.S. Application Data

(63) Continuation of application No. PCT/JP2021/012165, filed on Mar. 24, 2021.

(30) Foreign Application Priority Data

Mar. 31, 2020 (JP) .................. 2020-064890

(51) Int. Cl.
*F16F 1/12* (2006.01)
*F16F 15/067* (2006.01)

(52) U.S. Cl.
CPC ............ *F16F 1/126* (2013.01); *F16F 15/067* (2013.01); *F16F 2226/042* (2013.01); *F16F 2230/0023* (2013.01); *F16F 2230/02* (2013.01)

(58) Field of Classification Search
CPC .... F16F 1/126; F16F 15/067; F16F 2226/042; F16F 2230/0023; F16F 2230/02
See application file for complete search history.

(56) References Cited

U.S. PATENT DOCUMENTS 3,500,272 A * 3/1970 Fischer .................. H01F 27/322
                                                336/185
5,421,565 A * 6/1995 Harkrader .............. B60G 11/16
                                                267/221
(Continued)

FOREIGN PATENT DOCUMENTS

CN      106457947 A      2/2017
CN      108779823 A     11/2018
(Continued)

OTHER PUBLICATIONS

International Search Report for International Application No. PCT/JP2021/012165; Date of Mailing, May 18, 2021.
(Continued)

*Primary Examiner* — Vishal R Sahni
(74) *Attorney, Agent, or Firm* — CANTOR COLBURN LLP (57) ABSTRACT

A coil spring device includes: a main body spring and an insulator, the insulator is provided with a support groove which extends around a coil axis and into which a lower end portion of the main body spring is fitted, the lower end portion of the main body spring adheres to an inner surface of the support groove, the inner surface of the support groove is provided with a plurality of spacer protrusions which support an outer peripheral surface of a wire rod, a plurality of adjacent spacer protrusions adjacent to an open end edge of the support groove of the plurality of spacer protrusions each includes a pair of side wall surfaces extending toward the open end edge and are provided at intervals therebetween in an extension direction of the open end edge in a plan view of a part including the open end edge in the inner surface of the support groove, and inclination angles of the side wall surfaces adjacent to each other in the extension direction with the interval therebetween with respect to an (Continued)

orthogonal direction orthogonal to the open end edge are different from each other in the plan view.

4 Claims, 5 Drawing Sheets

(56) References Cited

U.S. PATENT DOCUMENTS

| | | |
|---|---|---|
| 9,777,787 B2 * | 10/2017 | Teichmann ............. F16F 1/126 |
| 2014/0225319 A1 | 8/2014 | Schüssler et al. |
| 2016/0333956 A1 | 11/2016 | Teichmann et al. |
| 2020/0391565 A1 | 12/2020 | Ogiso et al. |

FOREIGN PATENT DOCUMENTS

| | | |
|---|---|---|
| FR | 2770271 A1 | 4/1999 |
| JP | 3031149 U | 11/1996 |
| JP | 2014148208 A | 8/2014 |
| JP | 2017015249 A | 1/2017 |
| JP | 2019148273 A | 9/2019 |
| WO | 2019172329 A1 | 9/2019 |

OTHER PUBLICATIONS

EPO Extended European Search Report corresponding to EP Application No. 21778935.3; Mailing Date, Aug. 4, 2023.
CNIPA First Notification of Office Action for corresponding CN application No. 202180024410.8; Issued Dec. 26, 2024.

* cited by examiner

COIL SPRING DEVICE

CROSS-REFERENCE TO RELATED APPLICATIONS

This application is a continuation 35 U.S.C. § 120 of PCT/JP2021/012165, filed Mar. 24, 2021, which is incorporated herein by reference, and which claimed priority to Japanese Patent Application No. 2020-064890, filed Mar. 31, 2020, the entire content of which is also incorporated herein by reference.

TECHNICAL FIELD

The present invention relates to a coil spring device.

BACKGROUND ART

As a coil spring device that is used by being mounted on a suspension device, conventionally, a coil spring device including a main body spring in which a wire rod extends vertically in a spiral shape around a coil axis and an insulator which supports a lower end portion of the main body spring from below the main body spring is known. Here, the insulator is provided with a support groove which extends around a coil axis and into which the lower end portion of the main body spring is fitted, the lower end portion of the main body spring adheres to an inner surface of the support groove, and the inner surface of the support groove is provided with a plurality of spacer protrusions supporting an outer peripheral surface of the wire rod.

When the lower end portion of the main body spring adheres to the inner surface of the support groove, an adhesive is first placed on the inner surface of the support groove and then the lower end portion of the main body spring is pressed into the support groove to spread the adhesive on the inner surface of the support groove.

CITATION LIST

Patent Literature

[Patent Document 1]
  Japanese Unexamined Patent Application, First Publication No. 2017-15249

SUMMARY OF INVENTION

Technical Problem

However, in the conventional coil spring device, in the process in which the adhesive on the inner surface of the support groove is pressed into the lower end portion of the main body spring to flow toward the open end edge of the support groove, the flow is merged after branching by the spacer protrusion and reaches the open end edge of the support groove in the rectified state. Accordingly, there is a possibility that a weld line to be exposed that straddles a part of the open end edge of the support groove may be generated on the outer surface of the adhesive layer between the lower end portion of the main body spring and the inner surface of the support groove. In this case, since a part of the open end portion continuous to the open end edge in the inner surface of the support groove is exposed, there is a possibility that foreign substances such as small stones may enter this portion.

The present invention is made in view of the above-described circumstances and an object of the present invention is to provide a coil spring device capable of suppressing a weld line from being generated on an outer surface of an adhesive layer between a lower end portion of a main body spring and an inner surface of a support groove.

Solution to Problem

In order to solve the above-described problems and achieve such an object, a coil spring device according to a first aspect of the present invention includes: a main body spring in which a wire rod extends vertically in a spiral shape around a coil axis; and an insulator which supports a lower end portion of the main body spring from below the main body spring, wherein the insulator is provided with a support groove which extends around the coil axis and into which the lower end portion of the main body spring is fitted, wherein the lower end portion of the main body spring adheres to an inner surface of the support groove, wherein the inner surface of the support groove is provided with a plurality of spacer protrusions which support an outer peripheral surface of the wire rod, wherein a plurality of adjacent spacer protrusions adjacent to an open end edge of the support groove of the plurality of spacer protrusions each includes a pair of side wall surfaces extending toward the open end edge and are provided at intervals therebetween in an extension direction of the open end edge in a plan view of a part including the open end edge in the inner surface of the support groove, and wherein inclination angles of the side wall surfaces adjacent to each other in the extension direction with the interval therebetween with respect to an orthogonal direction orthogonal to the open end edge are different from each other in the plan view.

According to the present invention, since the inclination angles of the side wall surfaces adjacent to each other in the extension direction with the interval therebetween with respect to the orthogonal direction are different from each other in the plan view, for example, the direction or speed of the flow of the adhesive can be made different between one side wall surface and the other side wall surface defining the interval in the process in which the adhesive placed on the side opposite to the open end edge of the support groove with the adjacent spacer protrusion therebetween in the inner surface of the support groove flows toward the open end edge of the support groove while passing through the interval when the lower end portion of the main body spring adheres to the inner surface of the support groove. Further, when the interval becomes narrower as it becomes closer to the open end edge, the momentum of the flows can be weakened by causing two branch flows to interfere with each other as one branch flow flowing along one side wall surface divides the other branch flow flowing along the other side wall surface at the time of merging.

With the above-described configuration, the adhesive flowing through the interval is suppressed from reaching the open end edge of the support groove in the rectified state and it is possible to suppress the generation of the weld line to be exposed that straddles a part of the open end edge of the support groove in the orthogonal direction on the outer surface of the adhesive layer between the lower end portion of the main body spring and the inner surface of the support groove.

A second aspect of the present invention is a coil spring device, wherein in the coil spring device of the first aspect, at least one of the two adjacent spacer protrusions adjacent to each other in the extension direction is formed so that a width of the one of the two adjacent spacer protrusions in the extension direction becomes narrower as it becomes closer to the open end edge and inclination angles of the pair of side wall surfaces of the one of the two adjacent spacer protrusions with respect to the orthogonal direction are different from each other in the plan view.

In this case, at least one of the two adjacent spacer protrusions adjacent to each other in the extension direction is formed so that the width of the one of the two adjacent spacer protrusions in the extension direction becomes narrower as it becomes closer to the open end edge and the inclination angles of the pair of side wall surfaces of the one of the two adjacent spacer protrusions with respect to the orthogonal direction are different from each other in the plan view.

Thus, when the lower end portion of the main body spring adheres to the inner surface of the support groove, the momentum of flows can be weakened by causing two branch flows generated by branching a flow of the adhesive by the adjacent spacer protrusion to interfere with each other as one branch flow of the two branch flows divides the other branch flow of the two branch flows at the time of merging, for example, in the process in which the adhesive placed on the opposite side to the open end edge of the support groove with the adjacent spacer protrusion therebetween in the inner surface of the support groove flows toward the open end edge of the support groove between the inner surface of the support groove and the outer peripheral surface of the wire rod forming the lower end portion of the main body spring. Accordingly, two branch flows after merging are suppressed from reaching the open end edge of the support groove in the rectified state and it is possible to suppress the generation of the weld line to be exposed that straddles a part of the open end edge of the support groove in the orthogonal direction, on the outer surface of the adhesive layer between the lower end portion of the main body spring and the inner surface of the support groove.

A third aspect of the present invention is a coil spring device, wherein, in the coil spring device of the first or second aspect, at least one of the two adjacent spacer protrusions adjacent to each other in the extension direction is formed so that a width of the one of the two adjacent spacer protrusions in the extension direction becomes narrower as it becomes closer to the open end edge, and includes a front wall surface connecting end portions of the pair of side wall surfaces on the side of the open end edge and facing the open end edge, and an intersection of extension lines of the pair of side wall surfaces of the one of the two adjacent spacer protrusions is located on the inner surface of the support groove in the plan view.

In this case, when the lower end portion of the main body spring adheres to the inner surface of the support groove, two adhesive branch flows generated by branching a flow of the adhesive by the adjacent spacer protrusion as described above can be merged at a position separated to the rear side in the flow direction from the open end edge of the support groove. Accordingly, the momentum of the flows when these two branch flows reach the open end edge of the support groove is suppressed, and the generation of the weld line on the outer surface of the adhesive layer can then be reliably suppressed.

A fourth aspect of the present invention is a coil spring device, wherein, in the coil spring device of any one of the first to third aspects, at least one of the two intervals adjacent to each other in the extension direction becomes narrower as it becomes closer to the open end edge, and wherein an intersection of the extension lines of the side wall surfaces adjacent to each other in the extension direction with the interval therebetween in the plan view is located on the inner surface of the support groove.

In this case, since the intersection of the extension lines of the side wall surfaces adjacent to each other in the extension direction with the interval therebetween becoming narrower as it becomes closer to the open end edge is located on the inner surface of the support groove in the plan view, one adhesive flow flowing along one side wall surface defining the interval and the other adhesive flow flowing the other side wall surface defining the interval can be merged at a position separated to the rear side in the flow direction from the open end edge of the support groove when the lower end portion of the main body spring adheres to the inner surface of the support groove. Accordingly, the momentum of the flows when these two flows reach the open end edge of the support groove is suppressed and the generation of the weld line on the outer surface of the adhesive layer can then be reliably suppressed.

Advantageous Effects of Invention

According to the present invention, it is possible to suppress a weld line from being generated on an outer surface of an adhesive layer between a lower end portion of a main body spring and an inner surface of a support groove.

DESCRIPTION OF EMBODIMENTS

Hereinafter, a first embodiment of a coil spring device according to the present invention is described with reference to FIG. 1 to FIG. 4.

Figure 1:
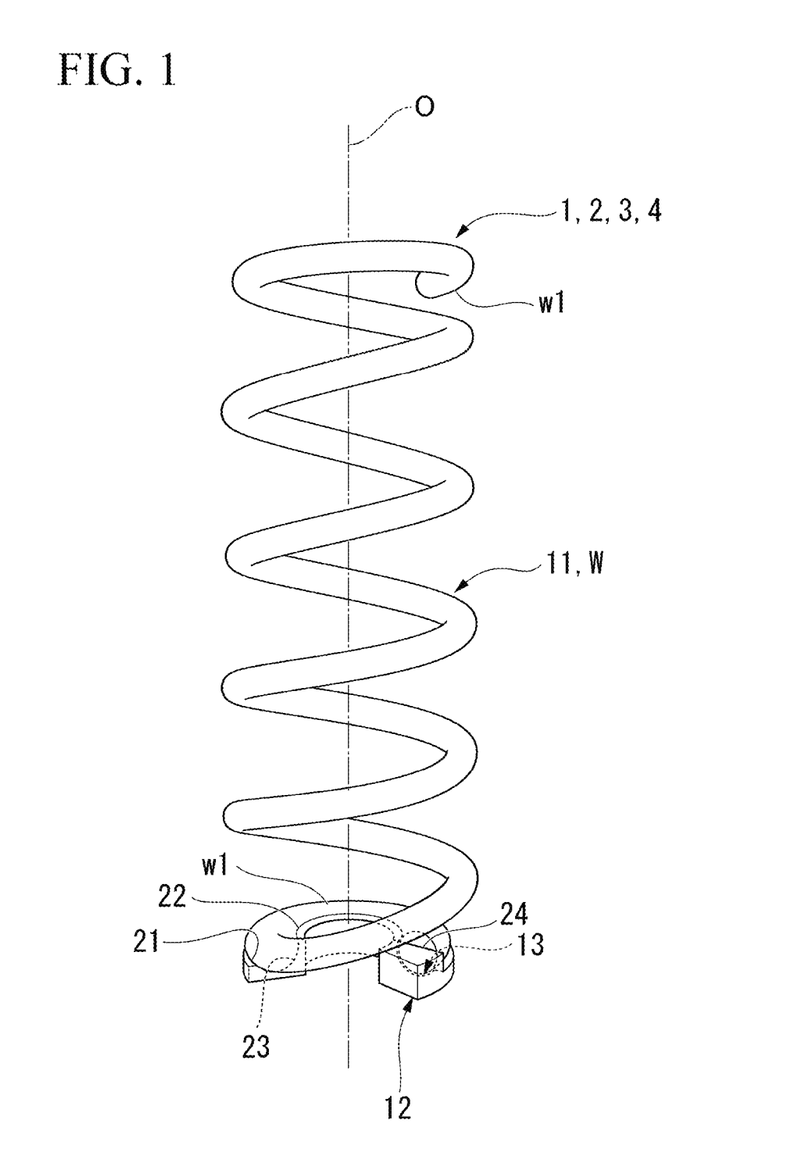
FIG. 1 is a perspective view of a coil spring device according to an embodiment of the present invention.

A coil spring device 1 includes a main body spring 11 in which a wire rod W extends vertically in a spiral shape around a coil axis O and an insulator 12 which supports a lower end portion of the main body spring 11 from below the main body spring 11. That is, the vertical direction is the direction of the coil axis O. The coil spring device 1 is used by being mounted on, for example, a shock absorber inserted into the main body spring 11 and a suspension device having a strut mount mounted on the upper end of the shock absorber.

The main body spring 11 is an open-end coil spring in which a terminated end portion w1 of the wire rod W is vertically separated from the wire rod W adjacent to the terminated end portion w1 on the inside of the direction of the coil axis O. The cross-sectional shape of the wire rod W is the same over the entire length including the terminated end portion w1. In the example shown in the drawings, the cross-sectional shape of the wire rod W is a circular shape.

Additionally, a closed-end coil spring in which the terminated end portion w1 of the wire rod W contacts and overlaps the wire rod W adjacent to the terminated end portion w1 on the inside of the direction of the coil axis O may be adopted as the main body spring 11. In this configuration, the terminated end portion w1 of the wire rod W may be subjected to, for example, grinding to form a flat surface extending in the horizontal direction orthogonal to the vertical direction and facing outward in the vertical direction. The cross-sectional shape of the wire rod W may be, for example, a rectangular shape or the like.

Figure 2:
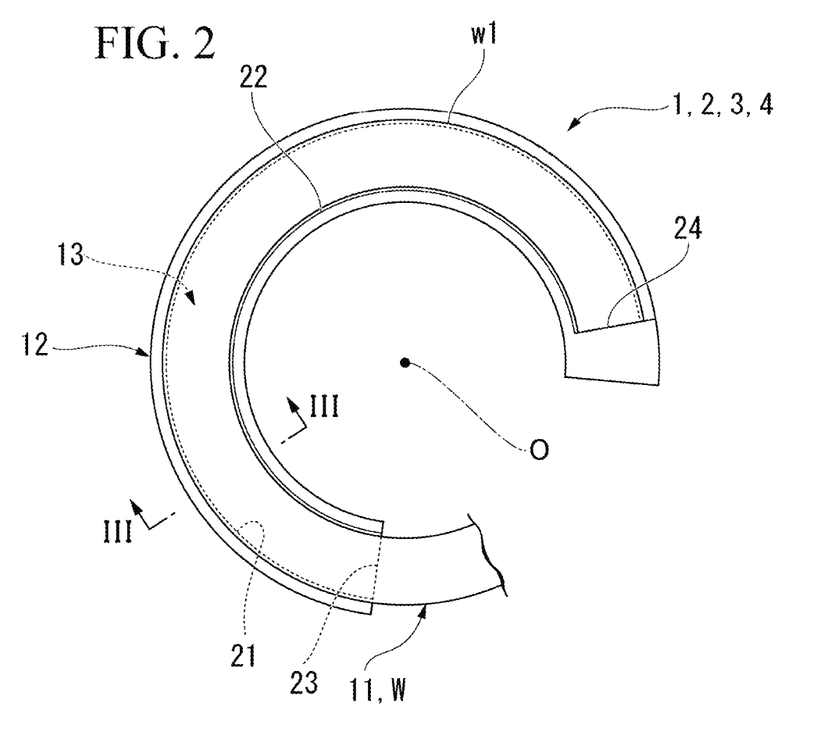
FIG. 2 is a plan view showing a part of the coil spring device of FIG. 1.

The insulator 12 is made of an elastic material such as rubber. As shown in FIG. 2, the insulator 12 has an arc shape extending around the coil axis O when viewed from the vertical direction. The insulator 12 extends over an angle range of 180° or more and 360° or less with respect to the coil axis O.

Figure 3:
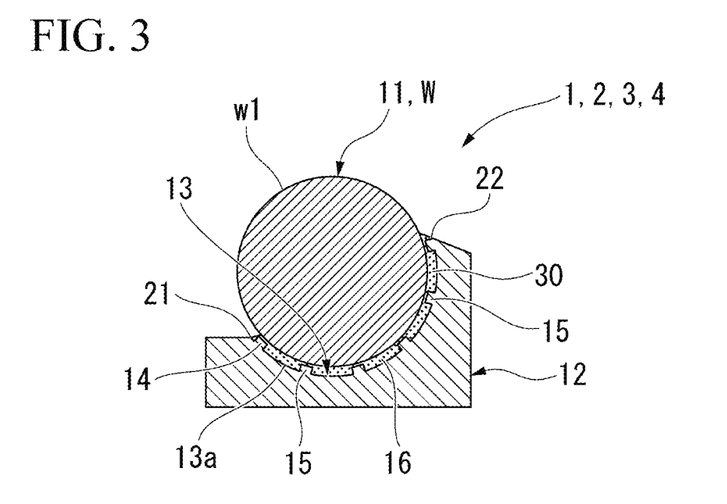
FIG. 3 is a cross-sectional view taken along a line of the coil spring device shown in FIG. 2.

The insulator 12 is provided with a support groove 13 which extends around the coil axis O and into which the lower end portion of the main body spring 11 is fitted. The support groove 13 extends over an angle range of 180° or more and 360° or less with respect to the coil axis O. As shown in FIG. 3, an adhesive layer 16 is provided between an inner surface 13a of the support groove 13 and the lower end portion of the main body spring 11 and the lower end portion of the main body spring 11 adheres to the inner surface 13a of the support groove 13.

The inner surface 13a of the support groove 13 is formed in a concave curved shape curved along the outer peripheral surface of the wire rod W. The support groove 13 integrally opens toward one side in the circumferential direction around the coil axis O, upward, and outward in the radial direction (direction orthogonal to the direction of the coil axis O).

Additionally, as the support groove 13, for example, a configuration in which the support groove opens toward both circumferential sides, a configuration in which the radial outside of the support groove is closed, or the like may be adopted.

Open end edges 21 to 24 of the support groove 13 include an outer peripheral edge 21 which is located at the radially outer end edge of the support groove 13 and extends around the coil axis O, an inner peripheral edge 22 which is located at the radially inner end edge of the support groove 13 and extends around the coil axis O, one end edge 23 which connects one end edges in the circumferential direction of the outer peripheral edge 21 and the inner peripheral edge 22, and the other end edge 24 which extends outward in the radial direction from the other end edge in the circumferential direction of the inner peripheral edge 22.

The outer peripheral edge 21 is located below the inner peripheral edge 22. One end edge 23 has a concave curved shape curved along the outer peripheral surface of the wire rod W when viewed from one side in the circumferential direction.

The inner surface 13a of the support groove 13 is provided with a plurality of spacer protrusions 14 and 15 which support the outer peripheral surface of the wire rod W.

The plurality of spacer protrusions 14 and 15 are provided on the inner surface 13a of the support groove 13 at intervals therebetween in the circumferential direction and the radial direction. The plurality of spacer protrusions 14 and 15 are provided over the entire area of the inner surface 13a of the support groove 13. The ratio of the volume of the spacer protrusions 14 and 15 occupying a gap between the inner surface 13a of the support groove 13 and the outer peripheral surface of the wire rod W exceeds 10% and the ratio of the volume of the adhesive layer 16 occupying the gap is smaller than 90%.

Figure 4:
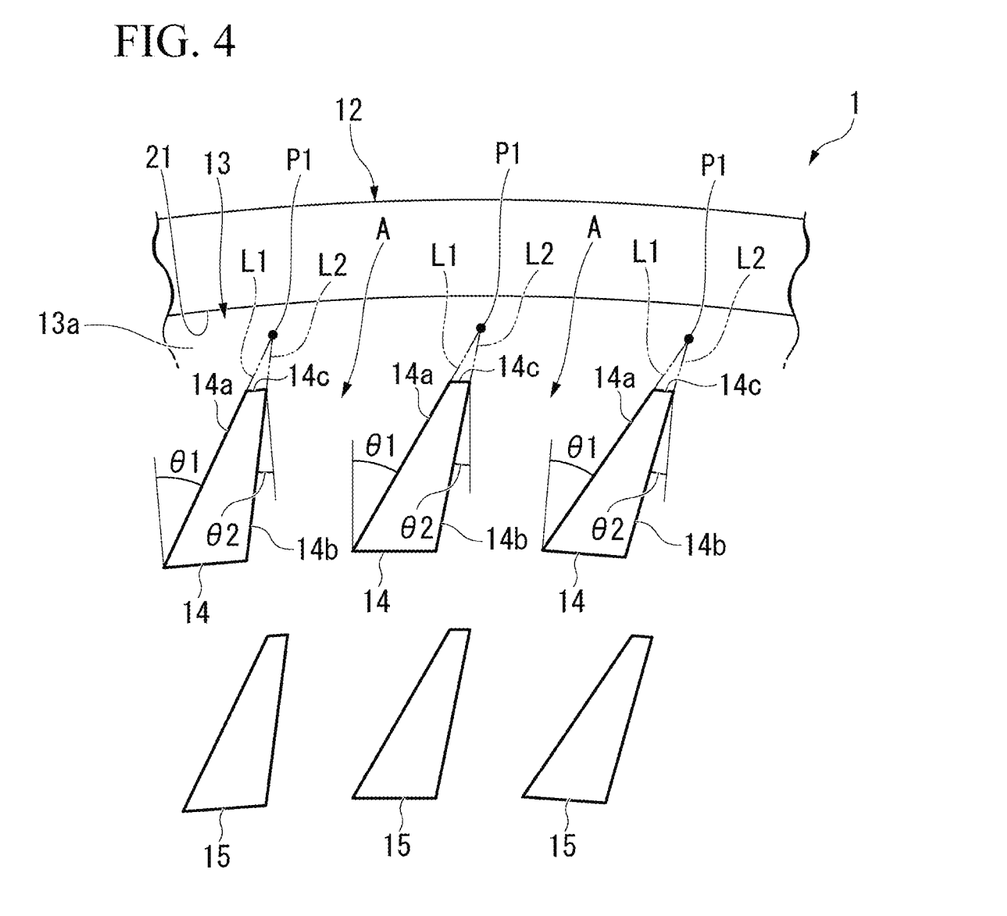
FIG. 4 is a plan view of a part including an outer peripheral edge of a support groove in an inner surface of the support groove shown as a first embodiment according to the present invention.

As shown in FIG. 4, the adjacent spacer protrusion 14, which is adjacent to the open end edges 21 to 24 of the support groove 13, of the plurality of spacer protrusions 14 and 15 includes a pair of side wall surfaces 14a and 14b which extends toward the open end edges 21 to 24. In the example shown in the drawing, the adjacent spacer protrusion 14 is adjacent to the outer peripheral edge 21 of the support groove 13 and the pair of side wall surfaces 14a and 14b of the adjacent spacer protrusion 14 extends toward the outer peripheral edge 21 of the support groove 13.

Additionally, as the adjacent spacer protrusion 14, a configuration may be adopted in which the side wall surfaces 14a and 14b of the adjacent spacer protrusion 14 extend toward the other open end edges 22 to 24 of the support groove 13 to be adjacent to the other open end edges 22 to 24 other than the outer peripheral edge 21 in the open end edges 21 to 24 of the support groove 13. In the plurality of spacer protrusions 14 and 15, the spacer protrusion 15 other than the adjacent spacer protrusion 14 may be formed in, for example, a columnar shape or the like which does not include the pair of side wall surfaces 14a and 14b.

As shown in FIG. 4, a plurality of the adjacent spacer protrusions 14 are provided at intervals A in the extension direction of the outer peripheral edge 21 of the support groove 13 in the plan view (in a view in the direction of the coil axis O) of the part including the outer peripheral edge 21 of the support groove 13 in the inner surface 13a of the support groove 13.

In the example shown in the drawing, the extension direction is same as the circumferential direction.

Then, at least one of two adjacent spacer protrusions 14 adjacent to each other in the circumferential direction is formed so that the width of the one of two adjacent spacer protrusions 14 in the circumferential direction becomes narrower as it becomes closer to the outer peripheral edge 21 of the support groove 13 and the inclination angles θ1 and θ2 of the pair of side wall surfaces 14a and 14b of the one of two adjacent spacer protrusions 14 with respect to the orthogonal direction orthogonal to the outer peripheral edge 21 of the support groove 13 in the plan view are different from each other.

In the example shown in the drawing, the orthogonal direction is same as the radial direction.

Further, at least one of two adjacent spacer protrusions 14 adjacent to each other in the circumferential direction is formed so that the circumferential width of the one of two adjacent spacer protrusions 14 becomes narrower as it becomes closer to the outer peripheral edge 21 of the support groove 13, and includes a front wall surface 14c connecting the end portions of the pair of side wall surfaces 14a and 14b on the side of the outer peripheral edge 21 of the support groove 13 and facing the outer peripheral edge 21 of the support groove 13, and an intersection P1 of the extension lines L1 and L2 of the pair of side wall surfaces 14a and 14b are located on the inner surface 13a of the support groove 13 in the plan view. That is, the intersection P1 is located between the front wall surface 14c and the outer peripheral edge 21 of the support groove 13. Additionally, in the plan view, the intersection P1 may be located on the outside of the support groove 13.

In the example shown in the drawing, the plurality of adjacent spacer protrusions 14 are formed to have the same size and the same shape.

The adjacent spacer protrusion 14 has a trapezoidal shape in which the front wall surface 14c forms an upper base and the pair of side wall surfaces 14a and 14b forms feet in the plan view. In the plan view, one side wall surface 14a of the pair of side wall surfaces 14a and 14b of each adjacent spacer protrusion 14 extends in a direction in which the one side wall surface 14a becomes closer to the other side wall surface 14b of the pair of side wall surfaces 14a and 14b as it becomes closer to the outer peripheral edge 21 of the support groove 13 and the other side wall surface 14b extends in a direction in which the other side wall surface 14b becomes farther from the one side wall surface 14a as it becomes closer to the outer peripheral edge 21 of the support groove 13.

Additionally, the pair of side wall surfaces 14a and 14b of each adjacent spacer protrusion 14 may extend in a direction in which the side wall surfaces 14a and 14b become closer to each other in the circumferential direction as they become closer to the outer peripheral edge 21 of the support groove 13 in the plan view.

In the plan view, the inclination angles $\theta 1$ and $\theta 2$ of the side wall surfaces 14a and 14b adjacent to each other in the circumferential direction with the interval A therebetween with respect to the radial direction are different from each other. The width of the interval A (the size in the circumferential direction) becomes wider as it becomes closer to the outer peripheral edge 21 of the support groove 13. The pair of side wall surfaces 14a and 14b extends straight in the plan view.

As described above, according to the coil spring device 1 of this embodiment, the inclination angles $\theta 1$ and $\theta 2$ of the side wall surfaces 14a and 14b adjacent to each other in the circumferential direction with the interval A therebetween with respect to the radial direction in the plan view are different.

Thus, when the lower end portion of the main body spring 11 adheres to the inner surface 13a of the support groove 13, for example, the direction or speed of the flows of the adhesive can be made different between a side of the one side wall surface 14a and a side of the other side wall surface 14b defining the interval A in the process in which the adhesive placed on the side opposite to the outer peripheral edge 21 of the support groove 13 with the adjacent spacer protrusion 14 therebetween in the inner surface 13a of the support groove 13 flows toward the outer peripheral edge 21 of the support groove 13 while passing through the interval A.

Accordingly, the adhesive flowing through the interval A is suppressed from reaching the outer peripheral edge 21 of the support groove 13 in a rectified state and it is possible to suppress the generation of the weld line on the outer surface of the adhesive layer 16 between the lower end portion of the main body spring 11 and the inner surface 13a of the support groove 13.

In this embodiment, at least one of two adjacent spacer protrusions 14 adjacent to each other in the circumferential direction is formed so that the width of the one of two adjacent spacer protrusions 14 becomes narrower as it becomes closer to the outer peripheral edge 21 of the support groove 13 and the inclination angles $\theta 1$ and $\theta 2$ of the pair of side wall surfaces 14a and 14b of the one of two adjacent spacer protrusions 14 with respect to the radial direction are different from each other in the plan view.

Thus, when the lower end portion of the main body spring 11 adheres to the inner surface 13a of the support groove 13, the momentum of the flows can be weakened by causing two branch flows, that are generated by branching a flow by the adjacent spacer protrusion 14, to interfere with each other as one branch flow of the two branch flows divides the other branch flow of the two branch flows at the time of merging, for example, in the process in which the adhesive placed on the side opposite to the outer peripheral edge 21 of the support groove 13 with the adjacent spacer protrusion 14 therebetween in the inner surface 13a of the support groove 13 flows toward the outer peripheral edge 21 of the support groove 13 between the inner surface 13a of the support groove 13 and the outer peripheral surface of the wire rod W forming the lower end portion of the main body spring 11. Accordingly, two branch flows merge after merging are suppressed from reaching the outer peripheral edge 21 of the support groove 13 in the rectified state and it is possible to suppress the generation of the weld line, exposing a part of the outer peripheral edge 21 of the support groove 13 to straddle the radial direction, on the outer surface of the adhesive layer 16 between the lower end portion of the main body spring 11 and the inner surface 13a of the support groove 13.

In this embodiment, at least one of two adjacent spacer protrusions 14 adjacent to each other in the circumferential direction is formed so that the width of the one of two adjacent spacer protrusions 14 becomes narrower as it becomes closer to the outer peripheral edge 21 of the support groove 13, and includes the front wall surface 14c connecting the end portions of the pair of side wall surfaces 14a and 14b on the side of the outer peripheral edge 21 of the support groove 13 and facing the outer peripheral edge 21 of the support groove 13, and the intersection P1 between the extension lines L1 and L2 of the pair of side wall surfaces 14a and 14b are located on the inner surface 13a of the support groove 13 in the plan view.

Thus, when the lower end portion of the main body spring 11 adheres to the inner surface 13a of the support groove 13, two adhesive branch flows generated by branching the flow by the adjacent spacer protrusion 14 as described above can be merged at a position separated towards the rear side in the flow direction from the outer peripheral edge 21 of the support groove 13 (a position separated to the inside in the radial direction from the outer peripheral edge 21). Accordingly, the momentum of the flows when these two branch flows reach the outer peripheral edge 21 of the support groove 13 is suppressed and the generation of the weld line on the outer surface of the adhesive layer 16 can be reliably suppressed.

Figure 5:
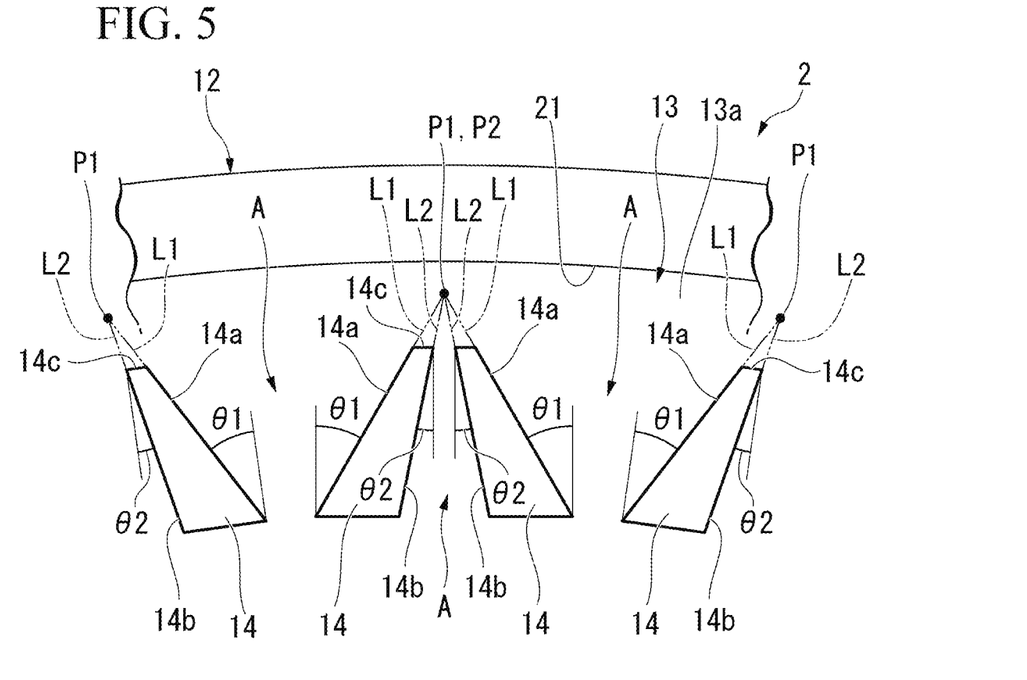
FIG. 5 is a plan view of a part including an outer peripheral edge of a support groove in an inner surface of the support groove shown as a second embodiment according to the present invention.

Next, a coil spring device 2 according to a second embodiment of the present invention is described with reference to FIG. 5.

Additionally, in the second embodiment, the same parts as the components in the first embodiment are designated by the same reference numerals, the description thereof is omitted, and only the different points are described.

In the coil spring device 2 of this embodiment, at least one of the two intervals A adjacent to each other in the circumferential direction becomes narrower as it becomes closer to the outer peripheral edge 21 of the support groove 13, and in the plan view, an intersection P2 of extension lines L2 of the side wall surfaces 14b adjacent to each other in the circumferential direction with the interval A therebetween is located on the inner surface 13a of the support groove 13. That is, the intersection P2 is located between the outer peripheral edge 21 of the support groove 13 and the front wall surface 14c.

In the example shown in the drawing, the adjacent spacer protrusions 14 adjacent to each other in the circumferential direction have a symmetrical shape with respect to a line extending in the radial direction through the center portion in the circumferential direction at the interval A in the plan view. In the plan view, the inclination angles θ1 of the side wall surfaces 14a adjacent to each other in the circumferential direction with the interval A therebetween with respect to the radial direction are the same as each other, and the inclination angles θ2 of the side wall surfaces 14b adjacent to each other in the circumferential direction with the interval A therebetween with respect to the radial direction are the same as each other. The interval A in which the width thereof becomes narrower as it becomes closer to the outer peripheral edge 21 of the support groove 13 and the interval A in which the width thereof becomes wider as it becomes closer to the outer peripheral edge 21 of the support groove 13 are alternately provided in the circumferential direction with the adjacent spacer protrusion 14 therebetween. In the plan view, the intersection P2 of the extension lines L2 of the side wall surfaces 14b defining the former interval A (the interval A having a width that becomes narrower as it becomes closer to the outer peripheral edge 21 of the support groove 13) is located on the inner surface 13a of the support groove 13. The intersection P2 coincides with the intersection P1 of each of the adjacent spacer protrusions 14 sandwiching the former interval A in the circumferential direction in the plan view.

Additionally, in the plan view, the intersection P2 may be located on the outside of the support groove 13 or may be located away from the intersection P1. Further, the inclination angles θ1 of the side wall surfaces 14a adjacent to each other in the circumferential direction with the interval A therebetween with respect to the radial direction may be different from each other in the plan view, and the inclination angles θ2 of the side wall surfaces 14b adjacent to each other in the circumferential direction with the interval A therebetween with respect to the radial direction may be different from each other in the plan view.

As described above, according to the coil spring device 2 of this embodiment, the intersection P2 of the extension lines L2 of the side wall surfaces 14b adjacent to each other in the circumferential direction with the interval A, becoming narrower as it becomes closer to the outer peripheral edge 21 of the support groove 13, therebetween is located on the inner surface 13a of the support groove 13 in the plan view. Accordingly, when the lower end portion of the main body spring 11 adheres to the inner surface 13a of the support groove 13, one adhesive flow flowing along one side wall surface 14b defining the interval A and the other adhesive flow flowing along the other side wall surface 14b defining the interval A can be merged at a position separated to the rear side in the flow direction from the outer peripheral edge 21 of the support groove 13 (a position separated to inside in the radial direction from the outer peripheral edge 21). Thus, the momentum of the flows when these two flows reach the outer peripheral edge 21 of the support groove 13 is suppressed and the generation of the weld line on the outer surface of the adhesive layer 16 can be reliably suppressed.

Figure 6:
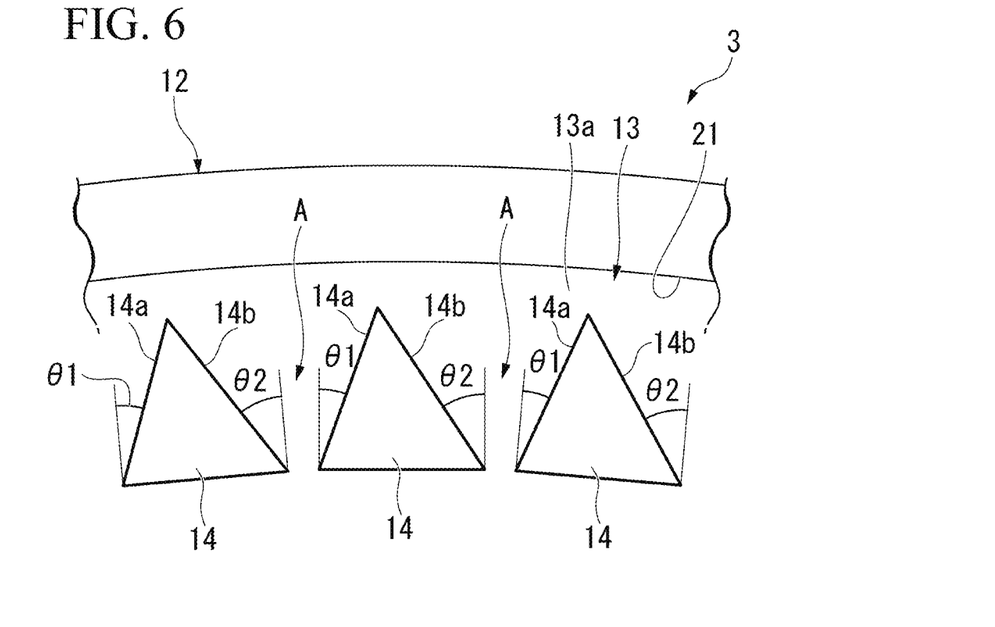
FIG. 6 is a plan view of a part including an outer peripheral edge of a support groove in an inner surface of the support groove shown as a third embodiment according to the present invention.

Next, a coil spring device 3 according to a third embodiment of the present invention is described with reference to FIG. 6.

Additionally, in the third embodiment, the same parts as the components in the first embodiment are designated by the same reference numerals, the description thereof is omitted, and only the different points are described.

In the coil spring device 3 of this embodiment, the adjacent spacer protrusion 14 does not include the front wall surface 14c and has a triangular shape sharpened toward the outer peripheral edge 21 side of the support groove 13 in the plan view. In the example shown in the drawing, the pair of side wall surfaces 14a and 14b of each adjacent spacer protrusion 14 extend in a direction in which the pair of side wall surfaces 14a and 14b become closer to each other in the circumferential direction as it becomes closer to the outer peripheral edge 21 of the support groove 13 in the plan view.

As described above, according to the coil spring device 3 of this embodiment, the operation and effect are almost the same as the coil spring device 1 of the first embodiment.

Figure 7:
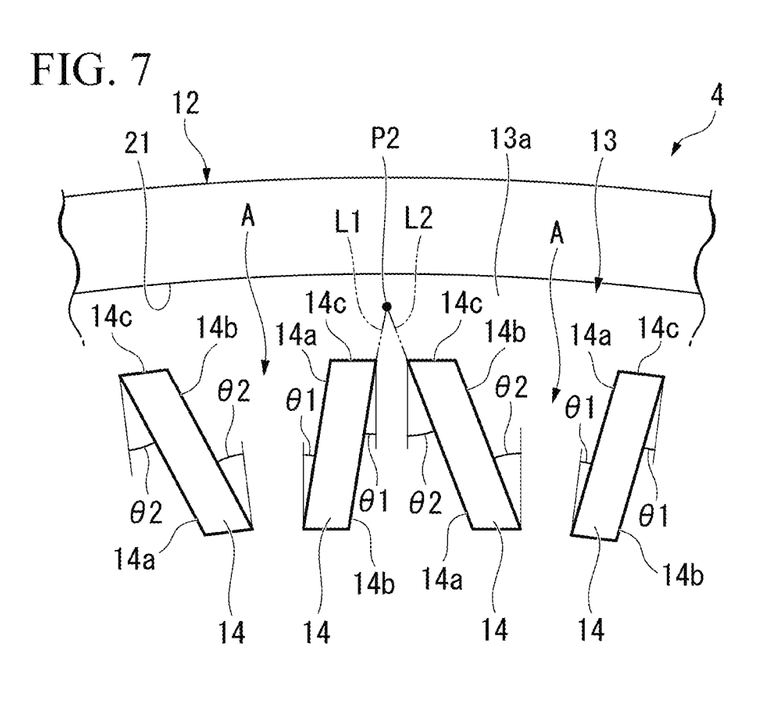
FIG. 7 is a plan view of a part including an outer peripheral edge of a support groove in an inner surface of the support groove shown as a fourth embodiment according to the present invention.

Next, a coil spring device 4 according to a fourth embodiment of the present invention is described with reference to FIG. 7.

Additionally, in the fourth embodiment, the same parts as the components in the first embodiment are designated by the same reference numerals, the description thereof is omitted, and only the different points are described.

In the coil spring device 4 of this embodiment, the inclination angles θ1 and θ2 of the side wall surfaces 14a and 14b adjacent to each other in the circumferential direction with the interval A therebetween with respect to the radial direction are different from each other in the plan view.

The inclination angles θ1 or θ2 of the pair of side wall surfaces 14a and 14b of each adjacent spacer protrusion 14 with respect to the radial direction are the same as each other in the plan view. In the example shown in the drawing, the adjacent spacer protrusion 14 has a parallel quadrilateral shape in the plan view.

Additionally, the planar shape of the adjacent spacer protrusion 14 is not limited to the parallel quadrilateral shape and may be appropriately changed. Further, the inclination angles θ1 or θ2 of the pair of side wall surfaces 14a and 14b of each adjacent spacer protrusion 14 with respect to the radial direction may be different from each other in the plan view.

At least one of the two intervals A adjacent to each other in the circumferential direction becomes narrower as it becomes closer to the outer peripheral edge 21 of the support groove 13. In the example shown in the drawing, the interval A in which the width thereof becomes narrower as it becomes closer to the outer peripheral edge 21 of the support groove 13 and the interval A in which the width thereof becomes wider as it becomes closer to the outer peripheral edge 21 of the support groove 13 are alternately provided in the circumferential direction with the adjacent spacer protrusion 14 therebetween. In the plan view, the intersection P2 of the extension lines L1 and L2 of the side wall surfaces 14a and 14b defining the former interval A is located on the inner surface 13a of the support groove 13. That is, the intersection P2 is located between the outer peripheral edge 21 of the support groove 13 and the front wall surface 14c. Additionally, the intersection P2 may be located on the outside of the support groove 13 in the plan view.

As described above, according to the coil spring device 4 of this embodiment, the inclination angles θ1 and θ2 of the side wall surfaces 14a and 14b adjacent to each other in the circumferential direction with the interval A therebetween with respect to the radial direction are different from each other in the plan view.

Thus, when the lower end portion of the main body spring 11 adheres to the inner surface 13a of the support groove 13, for example, the direction or speed of the flows of the adhesive can be made different between a side of one side wall surface 14a and a side of the other side wall surface 14b defining the interval A in the process in which the adhesive on the inner surface 13a of the support groove 13 flows toward the outer peripheral edge 21 of the support groove 13 while passing through the interval A. Further, when the interval A becomes narrower as it becomes closer to the outer peripheral edge 21 of the support groove 13, the momentum of the flows can be weakened by causing two branch flows to interfere with each other as one branch flow flowing along one side wall surface 14a divides the other branch flow flowing along the other side wall surface 14b at the time of merging.

With the above-described configuration, it is suppressed that the adhesive flowing through the interval A reaches the outer peripheral edge 21 of the support groove 13 in the rectified state and it is possible to suppress the generation of the weld line on the outer surface of the adhesive layer 16.

Since the intersection P2 of the extension lines L1 and L2 of the side wall surfaces 14a and 14b adjacent to each other in the circumferential direction with the interval A, becoming narrower as it becomes closer to the outer peripheral edge 21 of the support groove 13, therebetween is located on the inner surface 13a of the support groove 13 in the plan view, one adhesive flow flowing along one side wall surface 14a defining the interval A and the other adhesive flow flowing along the other side wall surface 14b defining the interval A can be merged at a position separated to the rear side in the flow direction from the outer peripheral edge 21 of the support groove 13 (a position separated to inside in the radial direction from the outer peripheral edge 21) when the lower end portion of the main body spring 11 adheres to the inner surface 13a of the support groove 13. Accordingly, the momentum of the flows when these two flows reach the outer peripheral edge 21 of the support groove 13 is suppressed and the generation of the weld line on the outer surface of the adhesive layer 16 can be reliably suppressed.

Additionally, the technical scope of the present invention is not limited to the embodiments described above, and various modifications can be made without departing from the objective of the present invention.

For example, the pair of side wall surfaces 14a and 14b may be curved in the plan view and the planar shape of the adjacent spacer protrusion 14 may be a shape with chamfered corners, an oval shape, or the like.

The adjacent spacer protrusion 14 may be provided over the entire length of the inner surface 13a of the support groove 13 in the radial direction.

Figure 8:
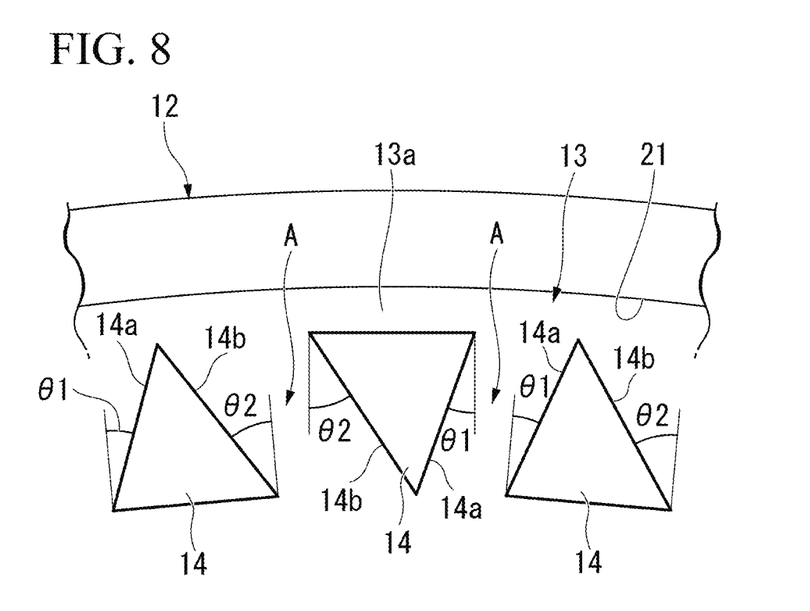
FIG. 8 is a plan view of a part including an outer peripheral edge of a support groove in an inner surface of the support groove shown as modified examples of the first embodiment and the third embodiment according to the present invention.

In the first embodiment or the third embodiment, for example, as shown in FIG. 8, one of the two adjacent spacer protrusions 14 adjacent to each other in the circumferential direction may be provided in a direction rotating about the center of the figure thereof by 180° in the plan view so that the width of the one of the two adjacent spacer protrusions 14 becomes wider as it becomes closer to the outer peripheral edge 21 of the support groove 13. In this case, the side wall surfaces 14a adjacent to each other in the circumferential direction with the interval A therebetween may be made parallel to each other in the plan view, and the side wall surfaces 14b adjacent to each other in the circumferential direction with the interval A therebetween may be made parallel to each other in the plan view. Also, in this case, the inclination angles θ1 of the side wall surfaces 14a with the interval A therebetween with respect to the radial direction may be the same as each other, and the inclination angles θ2 of the side wall surfaces 14b with the interval A therebetween with respect to the radial direction may be the same as each other.

In addition, the constituent elements in the above-described embodiment can be appropriately replaced with well-known constituent elements without departing from the objective of the present invention, and the embodiments described above, and modified example may be appropriately combined.

INDUSTRIAL APPLICABILITY

The present invention can be used in a coil spring device including a main body spring and an insulator including a support groove provided with a plurality of spacer protrusions.

What is claimed is:

1. A coil spring device comprising:
a main body spring in which a wire rod extends vertically in a spiral shape around a coil axis; and
an insulator which supports a lower end portion of the main body spring from below the main body spring,
wherein the insulator is provided with a support groove which extends around the coil axis and into which the lower end portion of the main body spring is fitted,
wherein an adhesive layer is provided between an inner surface of the support groove and the lower end portion of the main body spring,
wherein the lower end portion of the main body spring adheres to the inner surface of the support groove via the adhesive layer,
wherein the inner surface of the support groove is provided with a plurality of spacer protrusions which support an outer peripheral surface of the wire rod,
wherein a plurality of adjacent spacer protrusions of the plurality of spacer protrusions which are adjacent to an outer peripheral edge which extends around the coil axis and is located at an outer end edge of the support groove in a radial direction orthogonal to a direction of the coil axis along the coil axis each includes:
a top side wall surface which faces the wire rod, is separated from the inner surface of the support groove and linearly extends in a cross-sectional view viewed in a circumferential direction around the coil axis, and
a pair of side wall surfaces linearly extending toward the inner surface of the support groove from the top side wall surface, and, in a view in the direction of the coil axis, linearly extending toward the outer peripheral edge,
the plurality of adjacent spacer protrusions are provided at intervals therebetween in an extension direction of the outer peripheral edge in the view in the direction of the coil axis of a part including the outer peripheral edge in the inner surface of the support groove, and
wherein inclination angles of the side wall surfaces adjacent to each other in the extension direction with the interval therebetween with respect to an orthogonal direction orthogonal to the outer peripheral edge are different from each other in the view in the direction of the coil axis.

2. The coil spring device according to claim 1,
wherein at least one of the two adjacent spacer protrusions adjacent to each other in the extension direction is formed so that a width of the one of the two adjacent spacer protrusions in the extension direction becomes narrower as it becomes closer to the outer peripheral edge and inclination angles of the pair of side wall surfaces of the one of the two adjacent spacer protrusions with respect to the orthogonal direction are different from each other in the view in the direction of the coil axis.

3. The coil spring device according to claim 1,
wherein at least one of the two adjacent spacer protrusions adjacent to each other in the extension direction is formed so that a width of the one of the two adjacent spacer protrusions in the extension direction becomes narrower as it becomes closer to the outer peripheral edge, and includes a front wall surface connecting end portions of the pair of side wall surfaces on the side of the outer peripheral edge and facing the outer peripheral edge, and an intersection of extension lines of the pair of side wall surfaces of the one of the two adjacent spacer protrusions is located on the inner surface of the support groove in the view in the direction of the coil axis.

4. The coil spring device according to claim 1,
wherein at least one of the two intervals adjacent to each other in the extension direction becomes narrower as it becomes closer to the outer peripheral edge, and
wherein an intersection of the extension lines of the side wall surfaces adjacent to each other in the extension direction with the interval therebetween in the view in the direction of the coil axis is located on the inner surface of the support groove.

\* \* \* \* \*